Feb. 16, 1937.　　　　　F. A. ROSS　　　　　2,071,274
TIME INDICATING DEVICE
Filed Sept. 24, 1931　　　　8 Sheets-Sheet 2
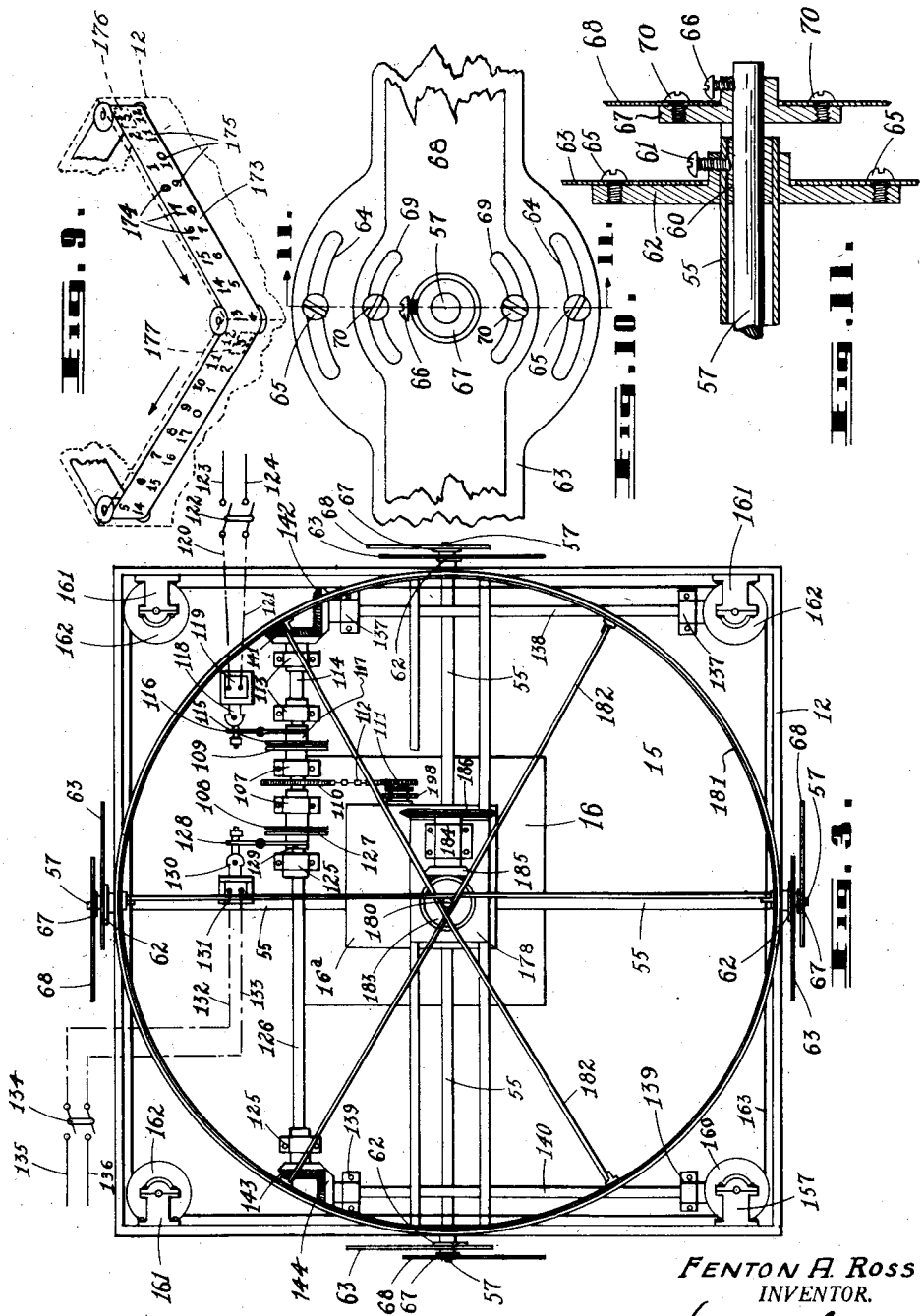
FENTON A. ROSS
INVENTOR.
BY
ATTORNEY.

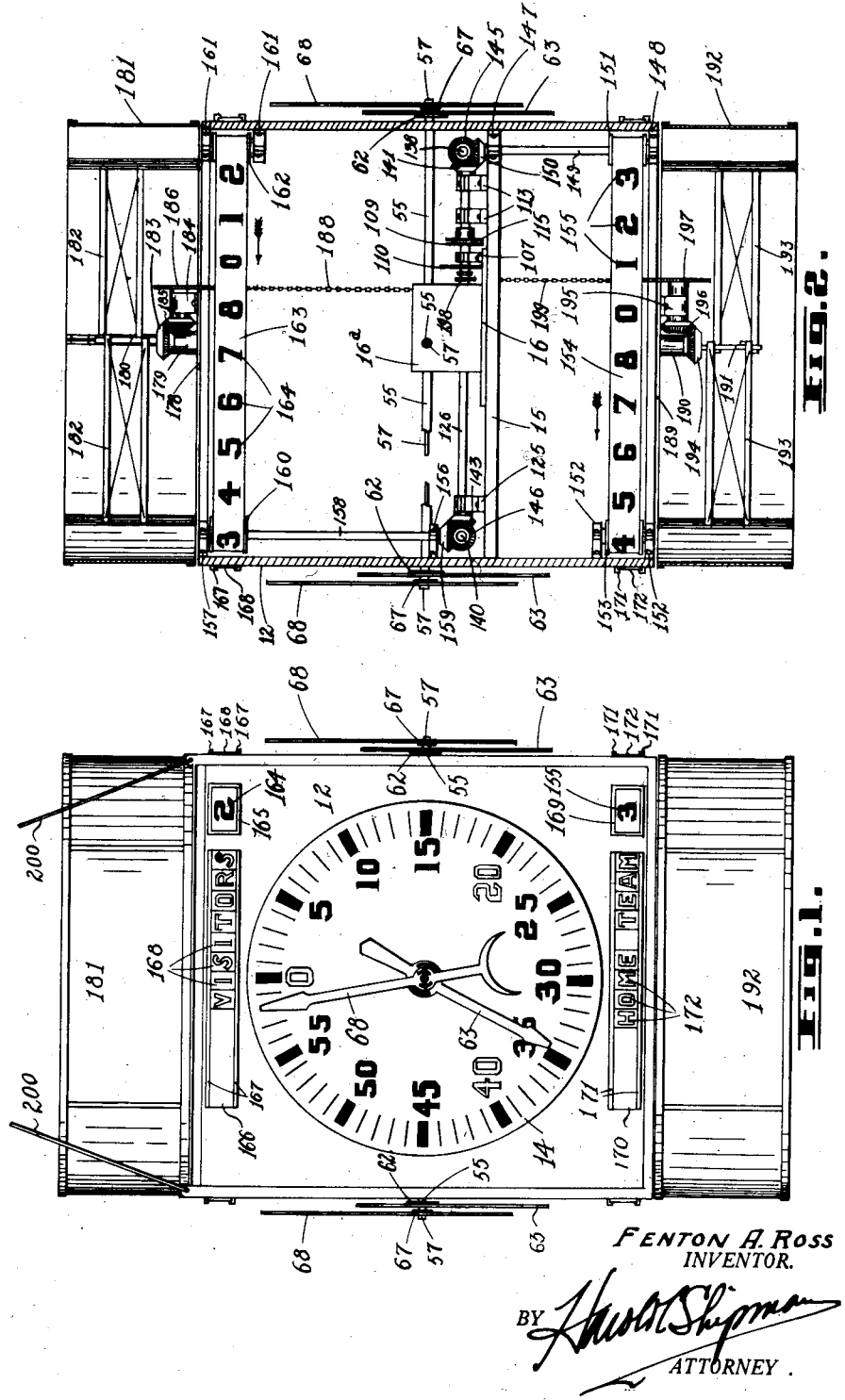

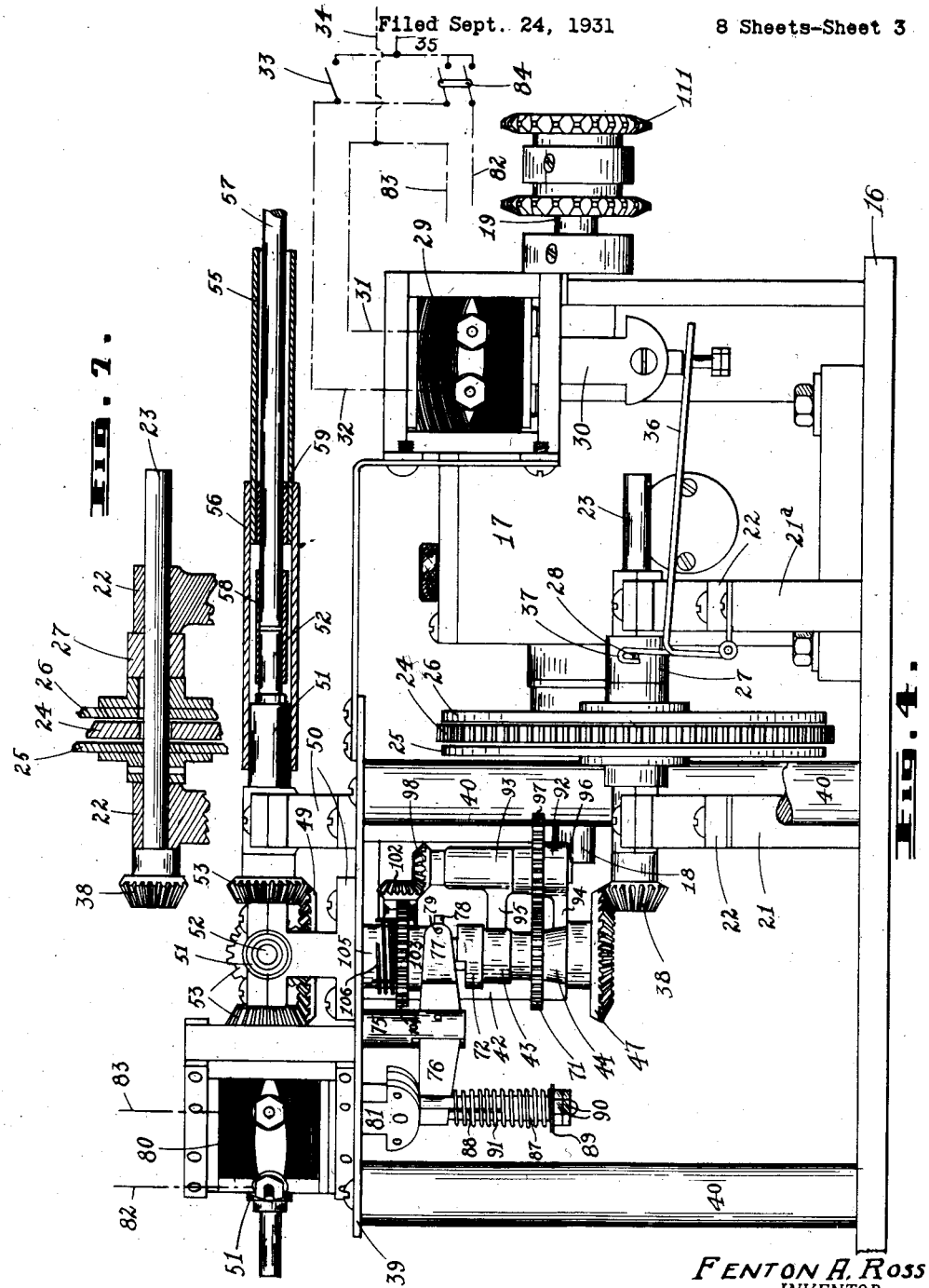

Feb. 16, 1937.   F. A. ROSS   2,071,274
TIME INDICATING DEVICE
Filed Sept. 24, 1931   8 Sheets-Sheet 4
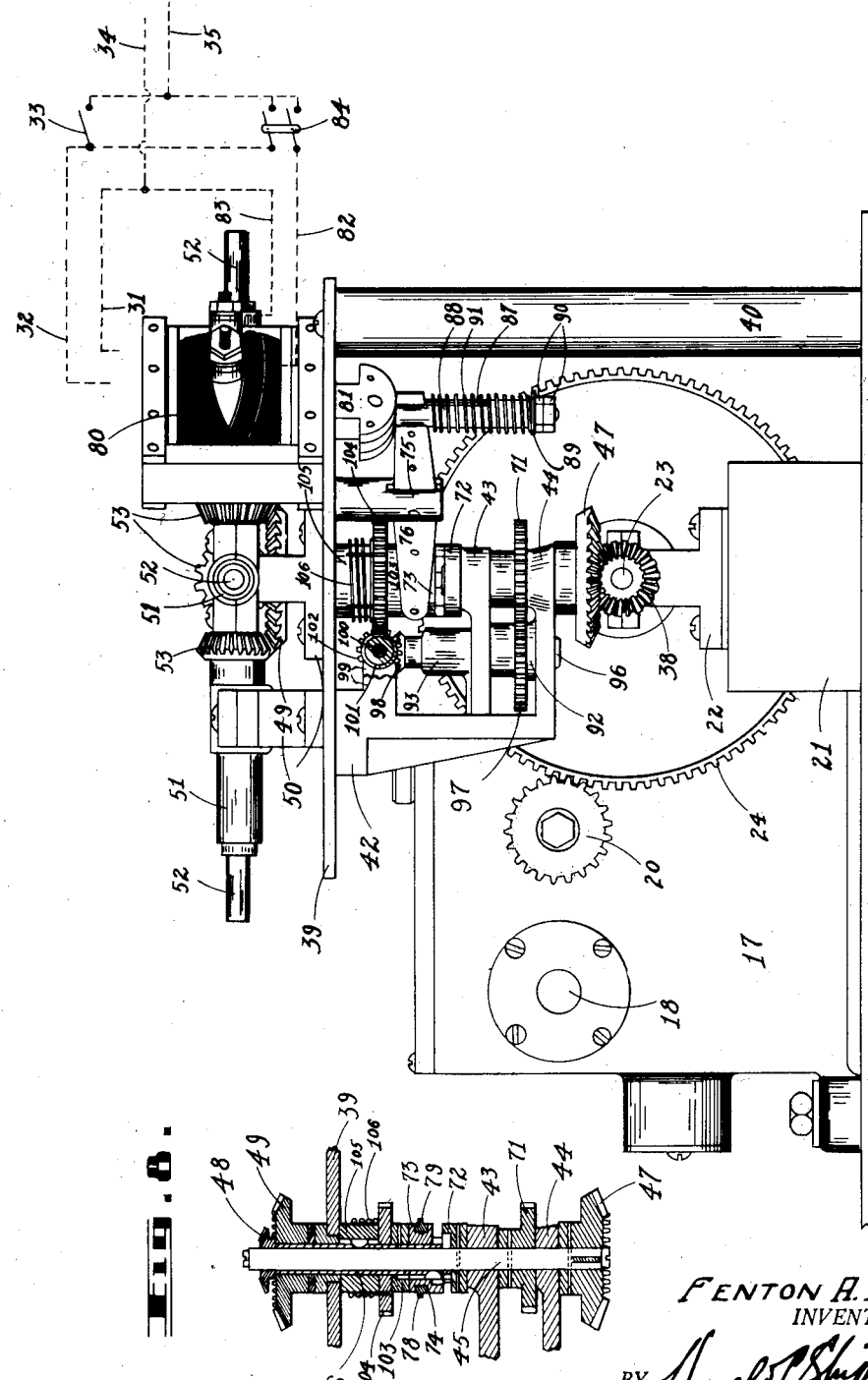
FENTON A. ROSS
INVENTOR.
BY Harold C. Shipman
ATTORNEY.

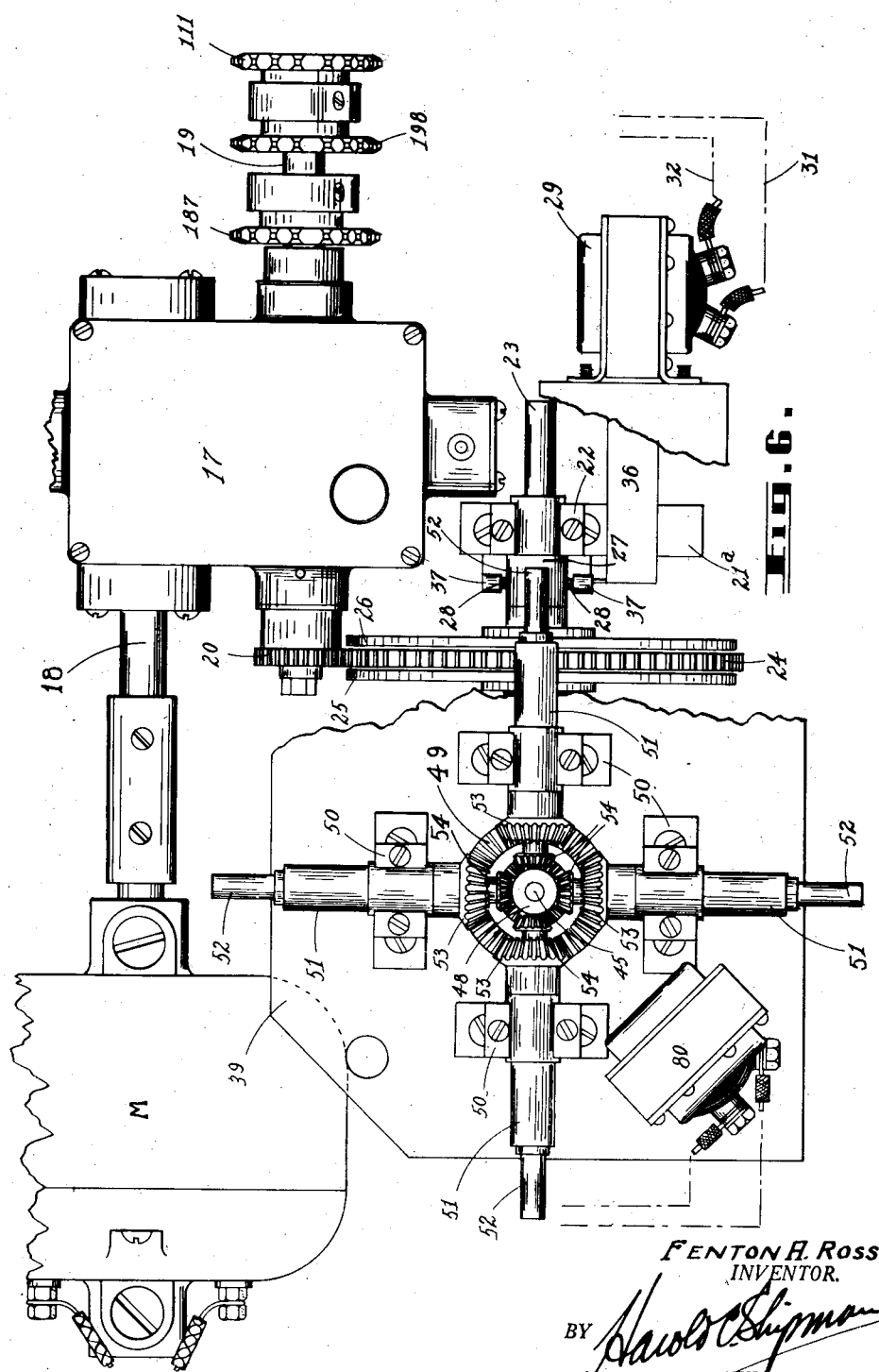

Feb. 16, 1937.  F. A. ROSS  2,071,274

TIME INDICATING DEVICE

Filed Sept. 24, 1931  8 Sheets—Sheet 6

FENTON A. ROSS
INVENTOR.

BY
ATTORNEY.

Feb. 16, 1937.  F. A. ROSS  2,071,274
TIME INDICATING DEVICE
Filed Sept. 24, 1931   8 Sheets-Sheet 7

Fenton A. Ross,
INVENTOR.

ATTORNEY.

Feb. 16, 1937.  F. A. ROSS  2,071,274

TIME INDICATING DEVICE

Filed Sept. 24, 1931  8 Sheets—Sheet 8

FENTON A. ROSS
INVENTOR.

BY *Harold Shipman*
ATTORNEY.

Patented Feb. 16, 1937

2,071,274

UNITED STATES PATENT OFFICE

2,071,274

TIME INDICATING DEVICE

Fenton Alexander Ross, Port Arthur, Ontario, Canada, assignor to Port Arthur Shipbuilding Company, Limited, Port Arthur, Ontario, Canada Application September 24, 1931, Serial No. 564,798
In Canada March 11, 1931

16 Claims. (Cl. 161—17)

This invention relates to a time indicating device and more particularly to a device for use in connection with the recording of time during sport contests, such as hockey, boxing and the like.

The principal object of my invention is the provision of a time indicating device, which embodies a plurality of faces each having one or more dials, one or more of which faces may be viewed from any location in an indoor or outdoor arena.

A further object of my invention is the provision of a time indicating device, embodying a plurality of sets of dials with associate, synchronously operated, hands and means associated with each set for controlling the operating mechanism to simultaneously start and stop their respective hands.

A further object is the provision of a time indicating device embodying means whereby the operating mechanism may be electrically controlled from a distance.

A further object is the provision of a time indicating device embodying dials with primary and secondary hands and means whereby the hands may be moved to any point on the dials at a predetermined rate of speed and the primary hands may be moved with the respective secondary hands to any point on the dials, at the normal rate of speed of the said secondary hands.

A further object is the provision of a time indicating device embodying dials with associated hands and means whereby the respective hands of each respective dial may be operated without relative variation of movement.

A further object is the provision of a scoring device in combination with my time indicating device, which scoring device displays score indicia which may be viewed from any location in the auditorium.

A further object is the provision of means whereby the scoring device is operated by the motive mechanism of the time indicating device and the operation of which scoring device may be electrically controlled from a distance.

A further object is the provision of a movable advertising display means rotatable or otherwise, which means is operated by the motive mechanism of the time indicating device.

A further object is the provision of a time indicating device, comprising one or more faces each face having one or more dials with associate hands or primary and secondary hands; an electric motor, designed to operate at a constant predetermined speed, and an intermediate transmission gear mechanism, between the respective hands and the motor, whereby the hands may be operated at a predetermined time-speed rotation.

A further object is the provision of a time indicating device having sets of dials, which dials embody means for indicating predetermined lengths of time, and associate hands which will indicate the passage of said predetermined lengths of time, when set in operation and will automatically cause said means to become inoperative and return to normal non-indicating position upon expiration of passage of said lengths of time.

A further object is the provision of a time indicating device particularly adaptable for sport contests and which embodies means for indicating the numbers of contestants who are serving time penalties, means for indicating the lengths of time of the penalties imposed and means for indicating the passage of time during such penalties which means upon completion of such indication will return to non-indicating position and said means for indicating length of time will become inoperative upon expiration of the time which it is indicating.

With these and other objects in view as will appear as the description proceeds, the invention consists of the novel construction, combination and arrangement of co-operating elements as hereinafter more specifically set forth, claimed and shown in the accompanying drawings forming a part of the present application, in which:

Fig. 1 is an elevation view of the preferred embodiment of my invention.

Fig. 2 is an elevation view of the preferred embodiment of my invention, the near wall of the casing being removed and the respective advertising means being shown in cross-section.

Fig. 3 is a top plan view of the preferred embodiment of my invention.

Fig. 4 is an elevation view of the motive transmission mechanism of my invention, the motor being removed.

Fig. 5 is a left end view of Fig. 4.

Fig. 6 is a top plan view of the motive transmission mechanism of my invention.

Fig. 7 is a cross-sectional view of the disc clutch mechanism of my invention.

Fig. 8 is a cross-sectional view of the jaw clutch mechanism of my invention.

Fig. 9 is a perspective view of a section of a modified form of the indicia belt forming a part of the scoring device of my invention.

Fig. 10 is a sectional view illustrating the means for adjustably retaining the primary and secondary hands of my time indicating device relative to their respective operating spindles.

Fig. 11 is a cross-sectional view taken on the line 11—11 of Fig. 10.

Like numerals of reference designate corresponding parts throughout the different views.

Figure 12:
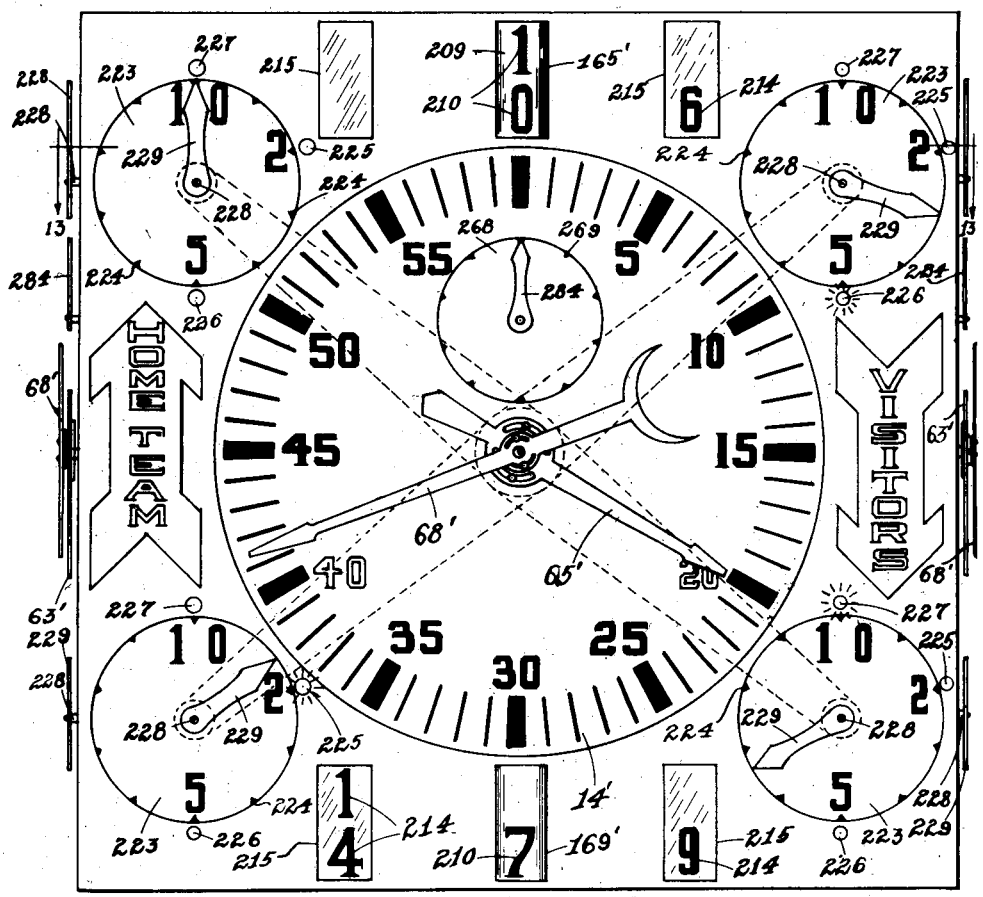
Fig. 12 is an elevation view of a modified form of my invention.

Referring to Figs. 1, 2 and 3, 12 is a multilateral sided casing provided on its respective sides with dials 14, which dials may be stamped, printed or painted on the respective faces of the casing 12 or may be formed as separate units and secured to the respective sides of the casing 12. 15 is a platform supported in the casing 12. 16 is a base plate supported on the platform 15. 16a is a casing supported on the base plate 16 and which casing contains the motive mechanism for my indicating device.

17 is a speed-reduction gear-unit supported on the base plate 16, within the casing 16a, which gear-unit is provided with a drive shaft 18 to which is connected a synchronous motor M. 19 is a rotary shaft extending through the speed-reduction gear-unit 17 and which rotary shaft is connected with the drive shaft 18 through a series of speed-reduction gears within the speed-reduction gear-unit 17. 20 is a pinion fixedly carried on one end of the rotary shaft 19.

21 and 21a are bearing-brackets, carried on the base plate 16, on which are supported the bearings 22. Rotatably supported in the bearings 22 is an axle 23. Freely mounted on the axle 23 is a disc-gear 24, which gear is in mesh with the pinion 20. 25 is a clutch-disc fixedly mounted on the axle 23 adjacent the disc-gear 24. 26 is a clutch-disc reciprocally mounted on the axle 23 in keyed relationship thereto. 27 is a collar freely mounted on the axle 23. The collar 27 has, extending laterally on each side thereof, the pins 28. 29 is a solenoid, which solenoid is provided with an armature 30 adapted to be vertically attracted upon energization of the solenoid 29. The solenoid 29 is provided with conductors 31 and 32. The conductor 32 is connected to a cutout-switch 33, which cutout-switch 33 has connected thereto the supply conductor 35, while the conductor 31 is connected to the supply conductor 34. 36 is a rocker-lever, rockably supported from the bearing-bracket 21a. The rocker-lever 36 is provided laterally adjacent its inner end with upwardly extending tongues 37, the extremities of which are engaged over the pins 28 respectively. Fixedly supported on one end of the axle 23 is a bevel-pinion 38.

39 is a deck-platform supported on the standards 40 in spaced relationship above the base-plate 16. 42 is a bracket secured to and extending downwardly from the under face of the deck-platform 39. 43 and 44 are bearings formed integral with the bracket 42 and extending inwardly therefrom. Rotatably supported in the bearings 43 and 44 and extending upwardly through the deck-platform 39 is a vertical shaft 45. 46 is a cylindrical shaft through which the vertical shaft 45 extends and which shaft 46 extends downwardly to a point intermediate the ends of the vertical shaft 45. 47 is a bevel-gear fixedly supported on the lower end of the vertical shaft 45, which bevel-gear is in mesh with the bevel-pinion 38. Fixedly supported on the upper end of the vertical shaft 45 is a bevel-gear 48. Fixedly supported on the upper end of the cylindrical shaft 46 is a bevel-gear 49.

Supported on the deck-platform 39 are bearings 50. Supported in each of the bearings 50 is a cylindrical stub-shaft 51. Carried in each of the cylindrical stub-shafts 51 is a rotatable stub-shaft 52. Supported on the inner end of each of the cylindrical stub-shafts 51 is a bevel-pinion 53, which pinions are in mesh with the bevel-gear 49. Supported on the inner end of each of the rotatable stub-shafts 52 is a bevel-pinion 54, which bevel-pinions are in mesh with the bevel-gear 48. 55 are hollow spindles connected at one end with each of the hollow stub-shafts 51 respectively by means of the cylindrical connecting-members 56. 57 are rotatable spindles extending through each of the hollow spindles 55 respectively, which rotatable spindles 57 are connected to the rotatable stub-shafts 52 respectively by means of the cylindrical connecting-members 58. 59 is a bearing-sleeve carried between the cylindrical hollow spindles 55 and the rotatable spindles 57 respectively. The outer ends of the hollow spindles 55 are retained in relationship to the rotatable spindles 57 by means of the bearing-sleeves 60 in which the rotatable spindles 57 are adapted to rotate. Secured, by means of the setscrew 61, to the outer ends of each of the hollow spindles 55 is a hub-disc 62. 63 are primary hands, each of which is provided with arcual slots 64 through which the setscrews 65 extend and are threadedly engaged in the hub-disc 62. Secured, by means of the setscrew 66, to the outer ends of each of the rotatable spindles 57 is a hub-disc 67. 68 are secondary hands, each of which is provided with arcual slots 69 through which the setscrews 70 extend and are threadedly engaged in the hub-disc 67.

Fixedly mounted on the vertical shaft 45 between the bearings 43 and 44 is a gear-wheel 71. Fixedly secured to the vertical shaft 45 is one portion 72 of a jaw clutch. Reciprocally mounted on the lower portion of the cylindrical shaft 46 and in keyed relationship thereto is one portion 73 of a jaw clutch, which portion 73 is adapted for engagement with the portion 72. Formed in the outer periphery of the portion 73 is an annular groove 74. 75 is a bifurcated bracket supported downwardly from the deck-platform 39. Rockably mounted in the bracket 75 is a rocker-lever 76, having a forked end 77. 78 is a semi-annular fork, straddling the portion 73 and seated in the groove 74. The forked end 77 of the rocker-lever 76 is pivotally connected to the integral lugs 79 formed on the semi-annular fork 78. 80 is a solenoid, which solenoid is provided with an armature 81 adapted to be vertically attracted upon energization of the solenoid 80. The solenoid 80 is provided with conductors 82 and 83. The conductor 82 is connected to a cutout-switch 84, which cutout-switch 84 has connected thereto the supply conductor 35, while the conductor 83 is connected to the supply conductor 34. Extending downwardly from and secured to the armature 81 is a rod 87, which rod is provided with a slot 88, through which the outer end of the rocker-lever 76 extends. 89 is a washer retained on the lower end of the rod 87 by means of the lock-nuts 90. Supported on the rod 87 between the outer end of the rocker-lever 76 and the washer 89 is an expansion spring 91. 92 and 93 are bearings formed on the outer end of the brackets 94 and 95 respectively, which brackets are integral with the bracket 42. Rotatably supported in the bearings 92 and 93, is a vertical shaft 96. Fixedly connected to the shaft 96 intermediate the bearings 92 and 93, is a gear-wheel 97, which gear-wheel is in mesh with the gear-wheel 71. 98 is a bevel-gear fixedly carried on the upper end of the vertical shaft 96. 99 are bearing-brackets integrally formed from the bracket 42. Rotatably supported in the brackets 99 is a shaft 100. Fixedly supported on the shaft 100 is a worm-pinion 101. Fixedly connected to one end of the rotatable shaft 100 is a bevel-gear 102, which bevel-gear 102 is in mesh with the bevel-gear 98. Fixedly secured to the vertical shaft 45 is an annular collar 103. Freely mounted on the vertical shaft 45 is a worm-gear 104. 105 is a cylindrical drum carried in keyed relationship on the cylindrical shaft 46. 106 is a coil spring tensionally wound around the drum 105 and having its lower coil fixedly connected to the worm-gear 104.

When it is desirous of setting the hands 63 and 68 in operation, electrical power will be transmitted to the synchronous motor M to energize the same. Rotary motion from the motor M will be transmitted through the drive shaft 18, the intermeshing reduction-gears within the speed-reduction gear-unit 17, the rotary shaft 19, pinion 20 and disc-gear 24, which disc-gear 24 will freely rotate on the shaft 23. The operator will now complete circuit through the conductors 32 and 35 by closing the cutout-switch 33. As soon as circuit is thus established, current will be transmitted through the solenoid 29 and the same will be energized. Upon energization of the solenoid 29, the armature 30 will be moved upwardly thereby and the outer end of the rocker-lever 36 will be raised upwardly. Through the medium of the pins 28 and the tongues 37 of the rocker-lever 36, the clutch-disc 26 will be forced to bear against the disc-gear 24 and will cause intermediate frictional engagement of the same between the respective clutch-discs 25 and 26. As soon as engagement is thus established, the rotary motion of the disc-gear 24 will be transmitted through the clutch-discs 25 and 26 to the axle 23 and rotary motion will be transmitted through the bevel-pinion 38, bevel-gear 47, vertical shaft 45, bevel-gear 48, bevel-pinions 54, rotatable stub-shafts 52, cylindrical connecting-members 58, rotatable spindles 57 and hub-discs 67 to the secondary hands 68. As the vertical shaft 45 rotates, rotary motion will be transmitted through the gear-wheel 71, gear-wheel 97, vertical shaft 96, bevel-gear 98, bevel-gear 102, shaft 100, worm-pinion 101, worm-gear 104, coil-spring 106, drum 105, vertical shaft 46, bevel-gear 49, bevel-pinions 53, hollow stub-shafts 51, cylindrical connecting-members 56, cylindrical spindles 55 and hub-discs 62 to the primary hands 63. The intermeshing relationship of the worm-pinion 101 and the worm-gear 104 have a predetermined speed ratio.

If desirous of setting the hands 63 and 68 at a predetermined location around the dials 14, the operator will complete circuit between the conductors 82 and 35, also between 32 and 35 by closing the cutout-switch 84 and opening the cutout-switch 33. As soon as circuit is thus established, current will be transmitted through the solenoids 80 and 29. The energizing of the solenoid 29 will set the hands 63 and 68 in time operation (as described in the preceding paragraph). The simultaneous energizing of the solenoid 80 will simultaneously put my time indicating device in reset operation and the armature 81 will be moved upwardly carrying with it the rod 87. As the rod 87 moves vertically, the expansion spring 91 will be compressed between the washer 89 and the outer end of the rocker-lever 76. As the spring 91 is compressed, the same will tend to move the 91 is compressed, the same will tend to move the outer end of the rocker-lever 76 upwardly and through the mediums of the rocker-lever 76, pins 79 and semi-annular collar 78, the portion 73 of the jaw clutch will be moved downwardly against the portion 72 of the jaw clutch. As the vertical shaft 45 continues to revolve, the portion 72 will be revolved and when the interlocking shoulders of the portion 72 revolve to an interlocking position relative to the interlocking shoulders of the portion 73, the expansion spring 91 will rock the rocker-lever 76 to cause the portion 73 to move into interlocking engagement with the portion 72. As locking takes place between the portions 73 and 72, rotary motion will be transmitted from the portion 72 through the portion 73 to the cylindrical shaft 46 and through the mediums of the bevel-gear 49, bevel-pinions 53, cylindrical stub-shafts 51, interconnecting-members 56, spindles 55 and hub-discs 62 to the primary hands 63. In this manner, the primary and secondary hands will be revolved around the respective dials 14 at the same rate of speed. The relationship of the portion 73 to the hollow vertical shaft 46 is such that upon interlocking engagement between the portions 73 and 72, the primary and secondary hands will be in direct, overlapping alignment with each other. As rotation is transmitted through the portions 73 and 72 to the cylindrical shaft 46, the drum 105 will be rotated in a contra direction to the windings of the coil spring 106 and the tensional engagement of the coil spring 106 on the drum 105 will be neutralized.

Thus the coil spring 106 acts as a clutch on the drum 105 when the worm gear 104 is rotated but will be non-operative when the worm gear 104 is stationary.

When the hands 63 and 68 have been rotated to the desired position relative to the indicia on the dials 14, the operator will open the cutout-switch 84. Consequently circuit to the solenoids 80 and 29 will be broken and the armature 81 will drop, causing the rocker-lever 76 to rock and release the portion 73 from engagement with the portion 72 of the jaw clutch. When it is again desirous of putting the hands 63 and 68 in time operation the switch 33 will be closed and ratio motion will be transmitted to the respective hands as hereinbefore described.

107 are bearing-brackets, supported on the platform 15, which carry a rotatable shaft having the clutch-discs 108 and 109 fixedly secured to the opposite ends thereof respectively and, intermediate the bearing-brackets 107, the sprocket 110. 111 is a sprocket fixedly carried on the rotary shaft 19. 112 is a chain belt trained over the sprockets 110 and 111 respectively. 113 are bearing-brackets supported on the platform 15 in alignment with the bearing-brackets 107, which bearing-brackets 113 carry the rotatable shaft 114. 115 is a clutch-disc reciprocally mounted on the shaft 114, in keyed relationship thereto and adjacent the clutch-disc 109. 116 is a rocker-lever, one end of which is in forked engagement with the hub-portion 117 of the clutch-disc 115. The opposite end of the rocker-lever 116 is in engagement with the armature 118 of the solenoid 119. The solenoid 119 is provided with conductors 120 and 121, which conductors are connected to a cutout-switch 122, which cutout-switch 122 has connected thereto the supply conductors 123 and 124. 125 are bearing-brackets supported on the platform 15 in alignment with the bearing-brackets 107, which bearing-brackets 125 carry the rotatable shaft 126. 127 is a clutch-disc reciprocally mounted on the shaft 126 in keyed relationship thereto and adjacent the clutch-disc 108. 128 is a rocker-lever, one end of which is in forked engagement with the hub-portion 129 of the clutch-disc 127. The opposite end of the rocker-lever 128 is in engagement with the armature 130 of the solenoid 131. The solenoid 131 is provided with conductors 132 and 133, which conductors are connected to a cutout-switch 134, which cutout-switch 134 has connected thereto the supply conductors 135 and 136. 137 are bearing-brackets, supported on the platform 15, which bearing-brackets carry therein the rotatable shaft 138. 139 are bearing-brackets, supported on the platform 15, which bearing-brackets carry therein the rotatable shaft 140. Fixedly connected to the outer end of the shaft 114 is a bevel-gear 141. Fixedly connected to one end of the shaft 138 is a bevel-gear 142, which bevel-gear 142 is in mesh with the bevel-gear 141. Fixedly connected to the outer end of the shaft 126 is a bevel-gear 143. Fixedly connected to one end of the shaft 140 is a bevel-gear 144, which bevel-gear 144 is in mesh with the bevel-gear 143. 145 designates a bevel gear fixedly connected to the opposite end of the shaft 138. Fixedly connected to the opposite end of the shaft 140 is a bevel-gear 146. 147 and 148 are bearing-brackets supported from the casing 12, which brackets carry therein the vertical shaft 149. Fixedly connected to the upper end of the shaft 149 is a bevel-gear 150, which bevel-gear 150 is in mesh with the bevel-gear 145. Fixedly carried on the shaft 149 is a drum 151. Rotatably supported between the brackets 152, adjacent each corner within the casing 12 and on a horizontal plane with the drum 151, are drums 153. Trained around the drums 153 and drum 151 is an endless flexible belt 154, which belt has imprinted or carries thereon numerical indicia as at 155. 156 and 157 are bearing-brackets, supported from the casing 12, which brackets carry therein the vertical shaft 158. Fixedly connected to the lower end of the shaft 158 is a bevel-gear 159, which bevel-gear 159 is in mesh with the bevel-gear 146. Fixedly carried on the shaft 158 is a drum 160. Rotatably supported between the brackets 161, adjacent each corner within the casing 12 and on a horizontal plane with the drum 160, are drums 162. Trained around the drums 162 and the drum 160, is an endless flexible belt 163, which belt has imprinted or carries thereon numerical indicia as at 164.

Formed through each of the respective walls of the casing 12, adjacent the right-side edge thereof and on a plane with the endless flexible belt 163, is a vision opening 165. Carried on each of the respective walls of the casing 12, adjacent its respective opening 165, is a plate 166 which plate is provided with grooved or rolled edges 167 between which edges the letter-plates 168 are adapted to be inserted and retained. Formed through each of the respective walls of the casing 12, adjacent the right-side edge thereof and on a plane with the endless flexible belt 154, is a vision opening 169. Carried on each of the respective walls of the casing 12, adjacent its respective opening 169, is a plate 170 which plate is provided with grooved or rolled edges 171 between which edges the letter-plates 172 are adapted to be inserted and retained. The indicia visible through the openings 165 and 169 indicate the number of goals or points scored by the respective opposing teams. In Fig. 1, I have shown the word "visitors" and the words "home team" opposite the respective vision openings 165 and 169.

If the visiting team scores a goal, the operator will close the cutout-switch 134 and electrical current will be transmitted to the solenoid 131. As the solenoid 131 is energized, the armature 130 will be attracted thereby and will operate the rocker-lever 128 to frictionally engage the clutch-disc 127 and the clutch-disc 108. As engagement takes place between the clutch-discs 127 and 108, rotary motion will be transmitted from the clutch-disc 108 through the medium of the clutch-disc 127, rotary shaft 126, bevel-gear 143, bevel gear 144, rotary shaft 140, bevel-gear 146, bevel-gear 159, vertical shaft 158 and drum 160. As rotary motion is thus transmitted to the drum 160, the flexible belt 163 will be moved in the direction of the arrow (Fig. 2) until the desired succeeding indicia 164 registers with the vision opening 165. The operator will now open the cutout-switch 134 and current flow will be cut off to the solenoid 131, the armature 130 will be released and through the medium of the rocker-lever 128, the clutch-disc 127 will be disengaged from the clutch-disc 108, the shafts 126, 140 and 158 will cease rotating and the flexible belt 163 will stop and remain stationary until the solenoid 131 is again energized.

If the home team scores a goal, the operator will close the cutout-switch 122 and electrical current will be transmitted to the solenoid 119. As the solenoid 119 is energized, the armature 118 will be attracted thereby and will operate the rocker-lever 116 to frictionally engage the clutch-disc 115 and the clutch-disc 109. As engagement takes place between the clutch-discs 115 and 109, rotary motion will be transmitted from the clutch-disc 109 through the medium of the clutch-disc 115, rotary shaft 114, bevel-gear 141, bevel-gear 142, rotary shaft 138, bevel-gear 145, bevel-gear 150, vertical shaft 149 and drum 151. As rotary motion is thus transmitted to the drum 151, the flexible belt 154 will be moved in the direction of the arrow (Fig. 2) until the desired succeeding indicia 155 registers with the vision openings 169. The operator will now open a cutout-switch 122 and current flow will be cut off to the solenoid 119, the armature 118 will be released and through the medium of the rocker-lever 116 the clutch-disc 115 will be disengaged from the clutch-disc 109, the shafts 114, 138 and 149 will cease rotating and the flexible belt 154 will stop and remain stationary until the solenoid 119 is again energized.

Referring to Fig. 9, I have disclosed a modified form of the flexible belt to be used in connection with my scoring device. In this modified form the flexible belt 173 is double the width of either the flexible belts 154 and 163, disclosed in Fig. 2, and carries thereon an upper and lower row of indicia 174 and 175. If it is desirous of using the modified form of my flexible belt as disclosed in Fig. 9, the vision openings 176 and 177 respectively (illustrated in dotted lines) will be formed alternately in the adjacent walls of the casing 12. The openings 176 will be formed on a higher plane than the openings 177 and, with this construction, a great number of indicia may be used in a manner as disclosed in Fig. 9.

Supported adjacent the top of the casing 12 and centrally thereof is a platform 178. Supported on the platform 178 is a vertical bearing 179. Rotatably supported in the bearing 179 is a vertical shaft 180. 181 is a cylindrical drum which is supported from the vertical shaft 180 by means of the brace-spokes 182. Fixedly supported on the vertical shaft 180 is a bevel-gear 183. Supported on the platform 178 is a horizontal bearing 184, which carries a rotatable shaft therein and which shaft carries, on the inner end thereof, the bevel-gear 185 and, on the outer end thereof, the sprocket 186. 187 is a sprocket fixedly connected to the shaft 19. 188 is a flexible chain belt, which belt is trained over the sprockets 186 and 187 to transmit rotation from the shaft 19 through the medium of the sprockets 187 and 186, the shaft supported in the bearing 184, the bevel-gear 185, bevel-gear 183, vertical shaft 180 and brace-spokes 182 to the drum 181.

Adjacent the bottom of the casing 12 and centrally thereof is a platform 189. Supported on the platform 189 is a vertical bearing 190. Rotatably supported in the bearing 190 is a vertical shaft 191. 192 is a cylindrical drum which is supported from the vertical shaft 191 by means of the brace-spokes 193. Fixedly supported on the vertical shaft 191 is a bevel-gear 194. Supported on the platform 189 is a horizontal bearing 195, which carries a rotatable shaft therein and which shaft carries, on the inner end thereof, the bevel-gear 196 and, on the outer end thereof, the sprocket 197. 198 is a sprocket fixedly connected to the shaft 19. 199 is a flexible chain belt, which belt is trained over the sprockets 197 and 198 to transmit rotation from the shaft 19 through the mediums of the sprockets 198 and 197, the shaft supported in the bearing 195, the bevel-gear 196, bevel-gear 194, vertical shaft 191 and brace-spokes 193 to the drum 192.

The drums 181 and 192 may be used for display advertising cards and as the same revolve, the various advertisements may be viewed from any point in an auditorium or the like. If desired, the drums 181 and 192 may have transparent walls and carry means thereon to illuminate the various advertisements on such walls.

200 are cables connected to each upper corner of the casing 12, which cables may be united at their upper ends and a suitable flexible cable attached thereto and trained over a pulley supported adjacent the roof of the auditorium and thence extended and wound around a suitable winch which may be operated to lower and raise the clock. If desired, the vertical shaft 180 may be hollow and a registering opening formed in the platform 178. A flexible cable may be secured adjacent the roof of the auditorium, suspended downwardly through the vertical shaft 180 and platform 178 and secured to a suitable drum within the casing 12, which drum may be provided with a solenoid-operated clutch mechanism rotated from the synchronous motor M, which provides motive power for the various mechanism used in my time indicating device.

In various sporting contests, where the time periods vary, different styles of dials may be used and the transmission mechanism of my time indicating device adapted to operate the hands in conjunction with such dials. For example, in hockey games, it may be desirous to record the respective 20-minute periods by a complete revolution of the primary hand 63 and one revolution of the secondary hand 68 to indicate one minute passage of time. This could readily be accomplished by altering the gear ratio of the transmission mechanism.

Figure 13:
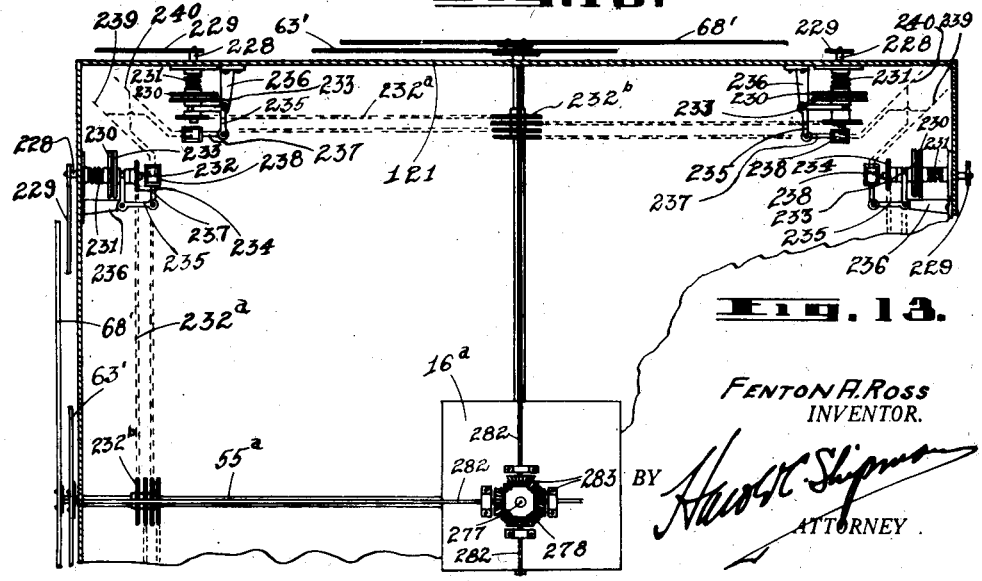
Fig. 13 is a sectional view taken on the line 13—13 of Fig. 12, parts being broken away.
Figure 14:
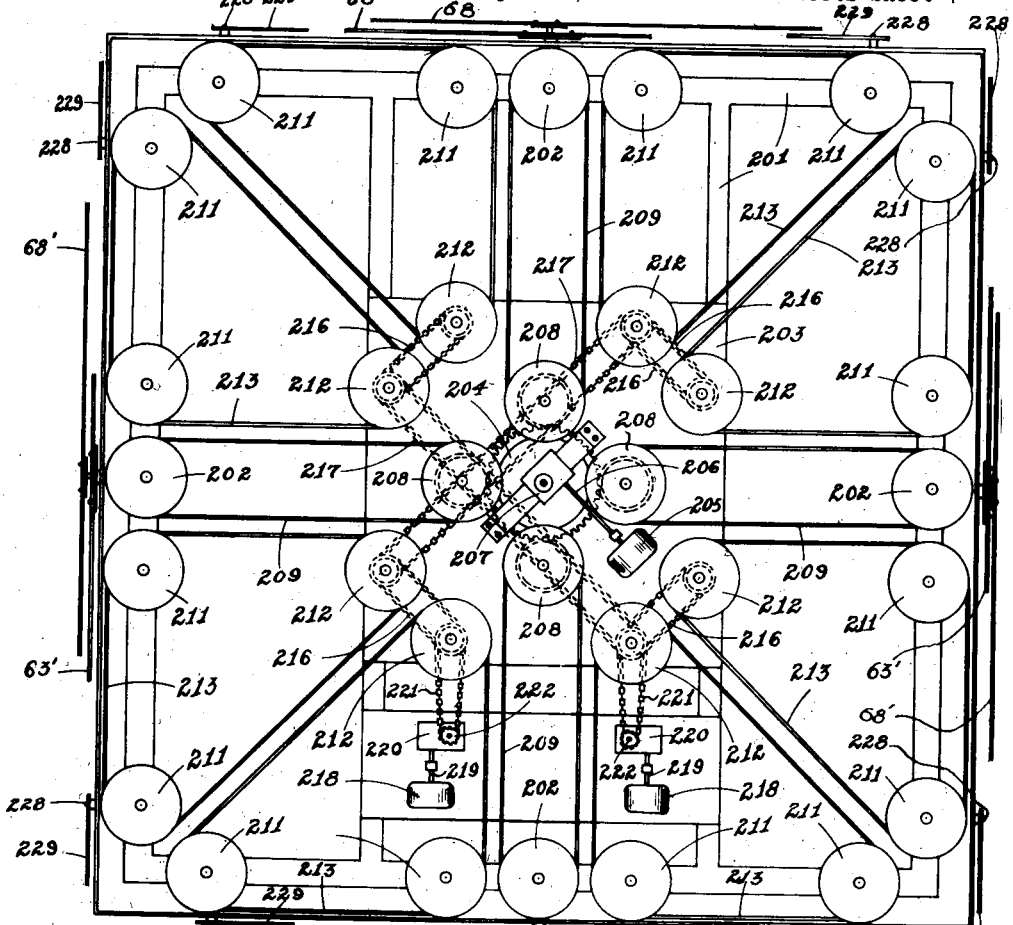
Fig. 14 is a top plan view of Fig. 12.

Referring to the modified form of my invention as disclosed in Figs. 12, 13 and 14, 12' is the casing which is provided with dials 14', which have in combination herewith the primary and secondary hands 63' and 68' respectively. The casing 12' has formed therein vision openings 165' and 169'. 201 is a supporting frame which supports the rotatable drums 202 respectively on a plane with the respective vision openings 165'. Supported on the frame 201 is a platform 203. Rotatably supported on the platform 203 is a gear 204 which is adapted to be rotated by means of the reversible motor 205 through the medium of the shaft 206 and the gear reduction unit 207. 208 are rotatable drums which have pinions fixedly connected thereto and which pinions are in mesh with the gear 204 so that upon rotation of the gear 204 by the motor 205, rotary motion will be transmitted to the drums 208. 209 are endless flexible indicia belts having indicia as at 210 imprinted thereon and which indicia belts are trained around the respective radially registering, pairs of drums 208 and 202 respectively, and are visible through their respective vision openings 165'.

211 are rotatable drums supported in pairs on the frame 201 in spaced relationship from each other on each side of each of the rotatable drums 202 respectively. 212 are rotatable drums respectively supported on the platform 203 in triangular spaced relationship from each pair of rotatable drums 211. 213 are endless flexible indicia belts which are trained around each respective set of rotatable drums comprised of a pair of drums 211 and its triangularly disposed drum 212. The endless belts 213 have indicia as at 214 imprinted thereon, which indicia is visible through the vision openings 215 formed in the casing 12'. The numerals 1 to 9 respectively, of the indicia 214 are laterally disposed in consecutive relationship while the tens portion of the indicia form 10 to 20 respectively are disposed above their respective units portion of their indicia so that in this manner it is possible to have a maximum number of numerical indicia imprinted on the endless belts 213. This method is also preferably used in printing the indicia 210 on the endless belts 209. 216 are endless drive chains which are trained over sprockets carried by the respective adjacent drums 212 thus linking the same together in pairs. 217 are endless drive chains which extend between the diagonally opposite pairs of drums 212 and trained around sprockets carried by one of the drums of said pairs. In this manner the units formed by the sets of triangularly disposed drums 211 and 212 respectively at diagonally opposite corners of the casing 12a are in series as a unit and upon rotation being imparted to one of said sets rotation will also be imparted to its adjacent set and the sets diagonally opposite thereto. 218 are reversible motors which, through the medium of the shafts 219, gear reduction units 220 and endless chain belts 221, which are each trained around a sprocket carried by the adjacent rotatable drum 212 and around a sprocket 222 forming a part of each of the gear reduction units 220, are adapted to transmit rotatable movement to the respective units composed of the sets of drums 211—212 as just hereinbefore mentioned. The construction composed of the members 201 to 222 inclusive is duplicated at the bottom of the modified form of my time indicating device with the indicia 210 and 214 visible through the openings 169' and 215 respectively.

Supported adjacent each of the vision openings 215 respectively is a penalty recording dial 223. The function of the four openings 215 is to show the number of players being penalized, each opening being provided for use in conjunction with its adjacent penalty timer 223. The dials 223 are provided around their periphery with ten equally spaced indicia points 224. The numerals 2, 5 and 10 are imprinted or otherwise provided adjacent the second, fifth and topmost points 224 respectively. Adjacent each of the indicia 2, 5 and 10, I provide an incandescent lamp 225, 226 and 227 respectively. 228 are shafts supported in the casing 12' and extending outwardly through each of the dials 223 respectively. Supported on the outermost end of each of the shafts 228 is a minute-hand 229. Fixedly mounted on each of the shafts 228 is a clutch disc 230. 231 is a recoil spring encircling each of the shafts 228, fixedly connected at one end to the casing 12' and at its opposite ends to its respective clutch disc 230.

232 is a shaft supported in direct alignment with each of the shafts 228 and having reciprocally mounted thereon and in keyed relationship thereto, a clutch-disc 233 and a sprocket 234 fixedly connected thereto. 232a are endless chain belts extending around each of the sprockets 234 respectively and a sprocket 232b fixedly connected to one of the hollow spindles 55a, which spindles correspond to the spindles 55 disclosed in Figs. 2 and 7. 235 are bell-cranks respectively rockably mounted on brackets 236 relative to each of the clutch discs 233 respectively and having one arm thereof pivotally connected to a collar which is adapted to reciprocate to move its respective clutch disc 233 toward and away from its respective clutch disc 230. The other arm of each of the bell-cranks 235 has connected thereto the armature 237 of a solenoid 238 so that upon energization of one of the solenoids 238 the armature 237 will cause its respective bell-crank 235 to move its respective clutch disc 233 into contact with its respective clutch-disc 230 to transmit movement from its respective spindle 55a, sprocket 232b, chain belt 232a, sprocket 234, clutch discs 233 and 230 and its shaft 228 to its respective minute-hand 229.

Figure 17:
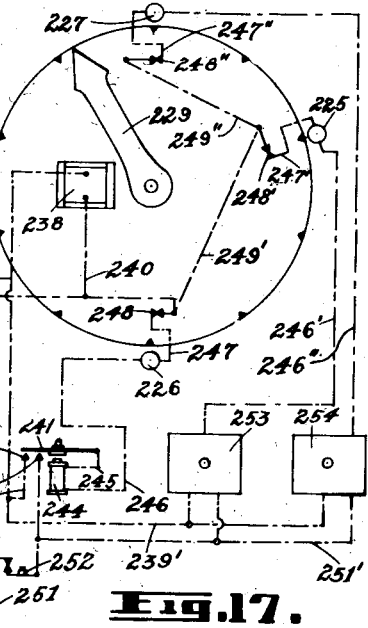
Fig. 17 is a schematic view of the electrical hookup for controlling the operation of the hands of certain of the time indicating dials disclosed in Fig. 12.

The solenoid 238 of the adjacent clutch transmission mechanism at the respective corners of the casing 12' are connected by means of electrical conductors 239 and 240 respectively which conductors are illustrated in the schematic view Fig. 17 in their circuit relationship.

Referring more specifically to Fig. 17 in which is illustrated the electrical circuits and means for controlling the operation of the penalty recording elements, 241 is an armature switch adapted to close circuit between the terminal points 242 and 243 respectively. 244 is an electromagnet having a conductor 245 as leading from one side thereof to the fixed end of the armature switch 241 and a conductor 246 leading from its opposite side to the incandescent lamp 226. 247 is a conductor leading from the incandescent lamp 226 to one side of a normally closed switch 248 which switch is adapted to be opened by the minute-hand 229 as the same contacts therewith. 249 is a conductor which leads from any suitable source of supply and which conductor is connected to the opposite side of the switch 248. 250 is a conductor connecting between the conductor 239 and the terminal point 242. 251 is a supply conductor which is provided with a cutout switch 252. The supply conductor 251 is connected to the terminal point 243. 253 and 254 are switch housings which have enclosed therein armature switches similar to the armature switch 241 and electromagnet 244 with similar associate conductors and terminal points as just hereinbefore referred to in connection with the armature switch 241. 239' is a junction conductor leading from the conductor 239 and which in turn has junction conductors which communicate with the terminal points in the housing 253 and 254, similar to the terminal point 242. 251' is a junction conductor extending from the conductor 251 and which in turn has junction conductors communicating with the terminal points, in the housing 253 and 254, similar to the terminal point 243. 246' is a conductor extending from the electromagnet in the housing 253 to the incandescent lamp 225. 246'' is a conductor extending from the electromagnet in the housing 254 to the incandescent lamp 227. 247' is a conductor leading from the incandescent lamp 225 to one side of a normally closed switch 248' which switch is adapted to be opened by the minute-hand 229 as the same contacts therewith. 249' is a conductor extending between the switches 248 and 248'. 247'' is a conductor leading from the incandescent lamp 227 to one side of a normally closed switch 248'' which switch is adapted to be opened by the minute hand 229 as the same contacts therewith. 249'' is a conductor extending between the switches 248' and 248''.

If during a sporting contest one of the contestants is penalized for five minutes the operator of the time recording device will close a switch (hereinafter referred to) to transmit energy to the motor 205, which, through the medium of the shaft 206, gear reduction unit 207, gear 204, and drums 208 and 202 will cause the endless belts 209 to rotate until the indicia as at 210, indicating the contestant's number, is visible through the vision opening 165' or 168' according as to whether the contestant is playing for the home team or the visitors. The operator will then press the button 241' on the switch 241 to close the same. As the switch 241 is closed current will flow through the circuit comprised of the conductor 251, terminal 243, switch 241, conductor 245, induction coil 244, conductor 246, incandescent lamp 226, conductor 247, switch 248 and conductor 249, thus causing the incandescent lamp 226 to become illuminated and the electromagnet 244 to become energized and which electromagnet through its magnetic attraction will retain the switch 241 in closed position relative to the terminal points 243 and 242. At the same time electric current will be circulated from the terminal point 243 through the switch 241, conductor 250, conductor 239, solenoid 238, conductor 240 and conductor 249. As current passes through the solenoids 238 the same will become energized and will consequently operate their respective bell-cranks 235 to move their respective clutch discs 233 into contact with their respective clutch discs 230 and consequently rotary motion will be imparted as just hereinbefore described to their respective minute-hands 229. At the expiration of five minutes the minute hands 229 will have registered and opened their respective switches 248 and consequently broken circuit to their respective incandescent lamps 226, solenoids 238 and electromagnets 244. As circuit is broken to the electromagnets, the same, becoming deenergized will release their respective armature switches 241 and current will be permanently broken between the terminal points 242 and 243. At the same time, as circuit is broken to the solenoids 238, the same, becoming deenergized, will release their respective bell-cranks 235 and consequently the clutch discs 233 will release their respective clutch discs 230 and as the same are thus released the recoil springs 231 will rotate their respective shafts 228 to return their respective hands 229 to normal upright inoperative position. It will be appreciated that upon closing the switches 241 in the switch housings 253 and 254, their respective incandescent lamps 225 and 227 will be illuminated and their respective solenoids 238 energized as hereinbefore described until either of the switches 248' or 248" are opened by the respective minute hands 229. From the foregoing it will be appreciated that indication is given to all officials, contestants and spectators, of the penalized contestants' numbers, the length of time of the penalties imposed and indication of the passage of time for the duration of such penalties. In this manner accurate indication is given of the moment the penalized contestant is to leave the play and the moment at which he is entitled to resume the play and during such penalty, indication is at all times given as to the part time of such penalty served and the remaining time of the penalty to be served before the contestant can resume play.

Referring to Fig. 12 it will be noted that each face of my time indicating device is provided with two penalty dials for the home team and two for the visiting team so that in this manner two contestants on each respective team may be serving penalties and full particulars are indicated as to the time served and the unexpired time of the penalties of each of said contestants. If desired a greater plurality of penalty dials may be provided for each of the respective teams but preferably I use two penalty dials for each team as in modern sports the rules and regulations afford for the penalization of a maximum of two contestants on each team.

Figure 19:
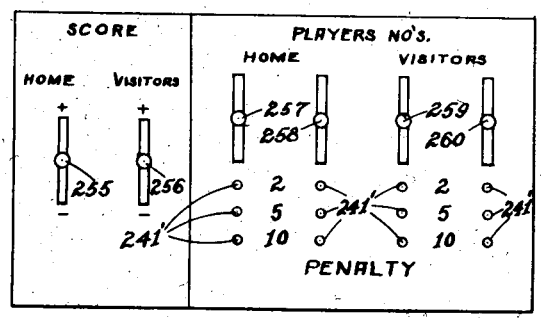
Fig. 19 is a plan view of the operator's control panel.

Referring to Fig. 19, in which I have illustrated the preferred control board for the operator, 255 is the switch which controls the motor adapted to operate the score drums and associate score indicia belts for the home team. 256 is the switch which controls the motor adapted to operate the score drums and associate score indicia belts for the visiting team. 257 and 258 are the switches which control the motors which are adapted to operate the respective drums and associate indicia belts to indicate the penalized players' numbers for the home team while 259 and 260 are the switches which control the motors which are adapted to operate the respective drums and indicia belts to indicate the numbers of the penalized players for the visiting team. 241" indicates the buttons which are adapted to be pressed to operate the armature switches 241 in circuit with the respective incandescent lamps 225, 226, and 227 respectively.

Figure 18:
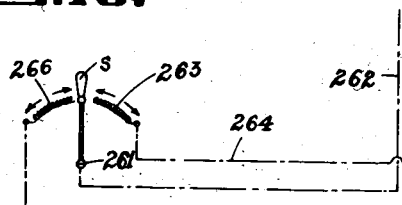
Fig. 18 is a schematic view of the electrical hookup for controlling the operation of certain of the motors used in combination with my timing device.

Referring to Fig. 18, I disclose the electrical circuit between each of the switches 255–260 inclusive and their respective motor. In this view the switch S corresponds to any one of the just hereinbefore mentioned switches 255 to 260 inclusive, while the motor M represents either of the motors 205 or 218. In this circuit the switch S is pivotally connected to a terminal 361 which has connected thereto a supply conductor 262. 263 is an arcual rheostat at one side of the switch S with which the switch S is adapted to contact to complete circuit between the conductor 262 and the conductor 264 which leads from the rheostat 263 to the motor M. 265 is the return conductor from the motor M. 266 is an arcual rheostat at the other side of the switch S and with which the switch S is adapted to contact to complete circuit between the conductor 262 and the conductor 267 which leads from the rheostat 266 to the motor M. The conductors 265 and 267 are so connected to the reversible motor M that upon throwing the switch S into contact with one of the rheostats 263 or 266 the motor will rotate in one direction and upon throwing the switch S to contact with the other rheostat the motor will rotate in a reverse direction. It will be appreciated that the degree of movement of the switch S contacting with either of the rheostats 263 or 266 will increase or decrease the speed rotation of the motor M.

Figure 16:
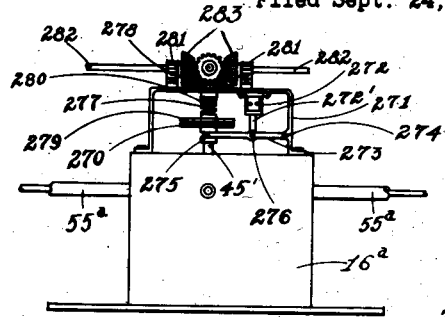
Fig. 16 is a sectional view of the transmission means and clutch for controlling the operation of the indicating hands on the timing dials forming a part of my invention.
Figure 15:
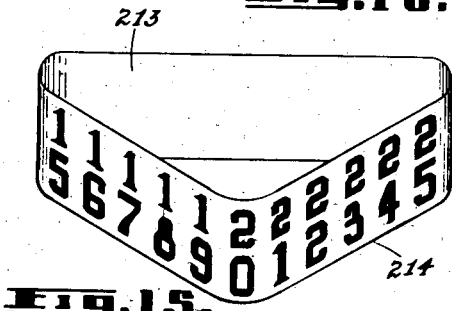
Fig. 15 is a perspective view of one of the indicia belts disclosed in Fig. 14.

Referring to Figs. 12 and 16, 268 is a timing dial the periphery of which is divided into 10 equal parts by means of second indicia points 269. In this modified form of my invention the vertical shaft 45 is extended upwardly through the motive mechanism casing 16a as at 45'. Reciprocally mounted in keyed relationship to the shaft 45' I provide a clutch disc 270. 271 is a frame supported above the motive mechanism casing 16a, which frame supports a solenoid 272. 273 is a forked lever pivotally connected at one end to the frame 271, as at 274, while the forked end thereof straddles a grooved collar 275 which is fixedly connected to the clutch disc 270. The armature 272' of the solenoid 272 is pivotally connected to the forked lever 273 as at 276. 277 is a shaft rotatably supported by the frame 271 in vertical alignment with the shaft 45'. Fixedly supported on the upper end of the shaft 277 is a bevel gear 278. Fixedly mounted on the lower end of the shaft 277 is a clutch disc 279. 280 is a recoil spring fixedly connected at its upper end to the frame 271 and at its lower end to the clutch disc 279. 281 are bearings supported on the frame 271 and which bearings support the inner ends of the rotatable shafts 282 extending respectively through each wall of the casing 12' and through the dials 268. 283 are bevel pinions fixedly mounted on the inner ends of each of the rotatable shafts 282 and in mesh with the bevel gear 278. Fixedly mounted on the outer end of each of the rotatable shafts 282 is a second hand 284.

In certain instances such as at the end of a contest where 10 seconds of play remain before finishing the game, the operator will close a suitable switch to energize the solenoid 272 which will cause the armature 272' to pull the lever 273 upwardly which in turn will force the revolving clutch disc 270 into contact with the clutch disc 279 and impart rotation thereto. As the clutch disc 279 rotates it will, in turn, rotate the shaft 277 and through the medium of the bevel gear 278, bevel pinions 283 and rotatable shafts 282 cause the second hands 284 to revolve around the dial 268. The ratio between the bevel pinions 283 and bevel gear 278 is such that rotary motion will be imparted from the shaft 45 to the hands 284 in such a manner that the hands will take 10 seconds to revolve completely around the dial 268. Thus the officials, contestants and spectators are aware of how many seconds remain before the final gong to announce the end of the game. Upon shutting off circuit to the solenoid, the same, becoming deenergized, will allow the armature 271 and lever 272 to drop and consequently frictional engagement will be broken between the clutch discs 270 and 279. After frictional engagement is thus broken the recoil spring 280 through its tendency to return to normal position will rotate the clutch disc 279 in a contra direction and consequently through the medium of the shaft 277, bevel gear 278, bevel pinions 283, and rotatable shafts 282, the hands 284 will be revolved in a reverse direction around the dial 268 to normal non-registering position. If desired suitable means (similar to that disclosed in Fig. 20) may be provided whereby the hands 284 as they revolve around the dial 268 will, upon registering with each of the indicia points 269, cause a bell or gong to ring. This would be found most advantageous in connection with boxing tournaments in instances when one contestant is down for the count. In such instances an official would immediately throw the switch to energize the solenoid 232 upon a contestant going down and the intermittent ringing of the bell would indicate the expiration of one second intervals. If the contestant should arise before the full 10-second count were completed the official would open the switch to deenergize the solenoid 272 and the recoil spring 280 through the medium of the bevel gears and rotatable shafts return the hands 284 to normal non-registering position.

Figure 20:
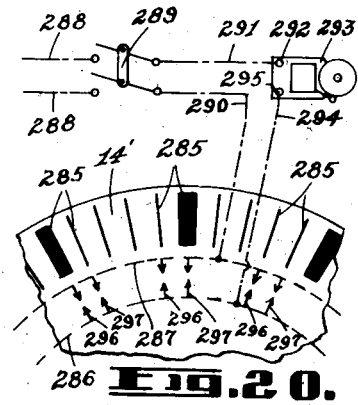
Fig. 20 is a view of a section of a modified form of timing dial for use in combination with my time indicating device.

Referring to Fig. 20, I illustrate a means whereby the dial 14' and associate hand 68' may be utilized to intermittently indicate time passage. In connection with the dial minute indicia marks 285 I provide two concentric conductors 286 and 287 which are in opposite sides of a circuit composed of the supply conductors 288 and cutout switch 289, conductor 290 from one side of the cutout switch 289 to the conductor 287, the conductor 291 from the opposite side of the cutout switch 289 to one terminal point 292 of an electric bell 293, the conductors 294 between the terminal point 295 and the conductor 286 and terminal switch 296 and 297. At the commencement of a boxing bout, an official will throw the switch 289 to closed position and as the bout progresses the minute hand 68' revolving around the dial 14' will complete circuit through each of the switches 296 and 297. As the hand 68' contacts with one of the switches 296 the bell or gong 293 will be sounded and then remain silent until the minute hand travels to the next succeeding switch 297 during the passage of a 3 minute round interval and upon contacting with the switch 297 will complete circuit to energize the bell 293 to indicate that the round is completed and a one minute rest period has commenced. As the minute hands contact with the next succeeding switch 296 the bell will again be energized to indicate that the rest period is over and the next round commenced. In this manner automatic indication is given to the contestants, officials and spectators and insures that the contestants are engaging in accurate 3 minute rounds and are given accurate one minute rest periods.

Figure 21:
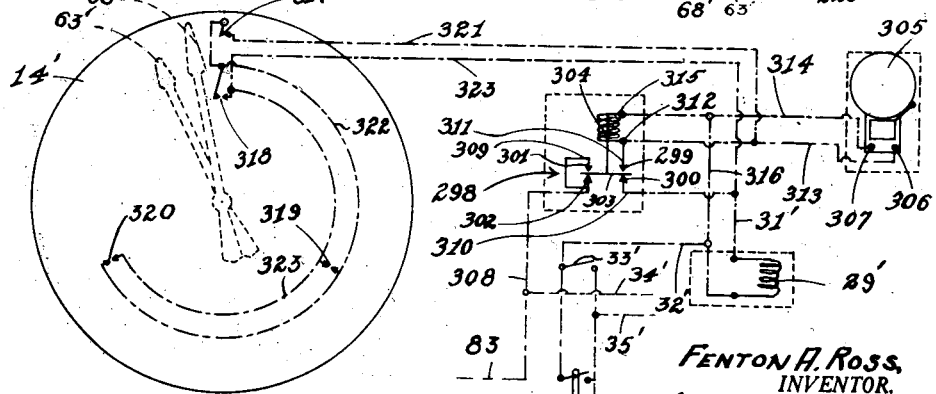
Fig. 21 is a schematic view of the electrical hookup for controlling the operation of a signal bell which is adapted to be energized to give warning upon expiration of a predetermined length of time as registered by my timing device.

Referring to Fig. 21 I disclose a means whereby an electric bell is caused to be energized upon expiration of a predetermined length of time during a sport contest or the like. In this illustration the conductors 34' and 35', solenoid 29', switch 33' and conductors 31' and 32' represent like elements as disclosed in Fig. 4 of the drawings. 298 is a relay switch composed of terminal points 299, 300, 301 and 302 and switch bar 303. 304 is an electro-magnet adapted, upon energization, to move the switch bar 303 from its position bridging the terminal points 300 and 302 to a position bridging between the terminal points 299 and 301. 305 is an electric bell having terminals 306 and 307. Extending in communication between the supply conductor 34' and the terminal point 302 is a conductor 308. 309 is a conductor extending between the terminal points 302 and 301. 310 is a conductor extending between the conductor 31' and the terminal point 300. 311 is a conductor extending between the terminal point 299 and the terminal 312 of the electro-magnet 304. 313 is a conductor extending between the terminal point 312 of the electro-magnet 304 and the terminal 306 of the electric bell 305. 314 is a conductor extending between the terminal 315 of the electro-magnet 304 and the terminal 307 of the electric bell 305. 316 is a conductor extending between the conductor 314 and the conductor 32'.

The dial 14 and hands 63 and 68 correspond to the dial 14' and hands 63' and 68' as disclosed in the preferred embodiment of my invention. 317 is a switch which is adapted to be closed upon contact of the secondary hand 68' therewith. 318, 319 and 320 are switches which are adapted to be closed upon contact of the primary hand 63 therewith. 321 is a conductor extending between the conductor 313 and one side of the switch 317. 322 is a conductor extending from the opposite side of the switch 317 and which is in communication with one side of each of the switches 318, 319 and 320. 323 is a conductor which is connected with the opposite side of each of the switches 318, 319 and 320 and which conductor is connected to the conductor 31.

When it is desirous of setting the primary and secondary hands 63' and 68' in time operation, the switch 33' will be closed and electric current will flow from the supply conductor 34', through the conductor 308, terminal point 302, switch bar 303, terminal point 300, conductor 310, conductor 31', solenoid 29', conductor 32, switch 33' and supply conductor 35', thus energizing the solenoid 29' and consequently throwing the transmission mechanism, as hereinbefore referred to, into time operation. As the primary hand 63' contacts with one of the switches 318, 319 or 320 and the secondary hand 68' simultaneously contacts with the switch 317, circuit will be completed between the conductors 321 and 323. As circuit is thus completed current will flow from the conductor 34', through the conductor 308, terminal 302, switch bar 303, terminal 300, conductor 310, conductor 323, through the closed switch 318, 319 or 320, conductor 322, switch 317, conductor 321, conductor 313, electro-magnet 304, conductor 314, conductor 316, conductor 32', switch 33' and conductor 35'. As current flows through the electro-magnet 304, the same will become energized and will move the switch bar 303 into position to bridge between the terminal points 299 and 301. When the switch bar 303 is in this position current will flow from the supply conductor 34' to the conductor 308, conductor 309, terminal point 301, switch bar 303, terminal point 299, electro-magnet 304, conductor 314, conductor 316, conductor 32', switch 33' and supply conductor 35', thus maintaining the electro-magnet 304 energized. As the switch bar 303 moves as just described circuit will be broken between the terminal points 302 and 300 and consequently the solenoid 29' will become de-energized, the transmission mechanism will become inoperative and the primary and secondary hands 63' and 68' will remain stationary. As current flows through the conductor 321, it will be circuited through the conductor 313, electric bell 305, conductor 314, conductor 316, conductor 32', switch 33' and supply conductor 35' and the electric bell will become energized and give audible warning that a predetermined length of time has expired. When it is desirous of silencing the electric bell 305, the switch 33' may be opened and current will be cut off to the electro-magnet 304 and the switch bar 303 will return to position to bridge the terminal points 300 and 302 and consequently break circuit between the terminal points 299 and 301 thus cutting off current to the electric bell 305. The transmission mechanism may again be put into operation by closing the switch 33' and current will be conducted as hereinbefore described through the solenoid 29' which will operate to throw the motive transmission into time operation as hereinbefore described.

The switches 318, 319 and 320 are preferably disposed at 20 minute intervals around the dial 14', as, in professional hockey, 20 minutes designates the duration of each period during the contest. If desired the switches 318, 319 and 320 may be disposed, or a greater plurality of such switches may be provided to accommodate the timing of different sport contests.

The foregoing specification and annexed drawings disclose the preferred embodiment of my invention, but it is to be understood that minor changes may be resorted to in the commercial adaptation of my invention without departing from the scope of the invention as hereinafter claimed.

The purpose of rotating the hands 65 and 68 at the speed of the second hand, is to enable the hands to be reset in relative positions to each other at zero or any desired place on the dial at the faster speed of the second hand. In other words it is important under some if not most uses of the indicating device to reset the hands in the shortest possible time in order that the device may be available, for example, between two bouts of a boxing show, or two hockey games. The reset mechanism whereby the second hand or hands picks up the minute hand or hands and rotates both at the fast speed of the second hand, maintains the hands in fixed relation, so that when the reset is completed at zero or any other point on the dial, the reset drive is disengaged and the hands will remain in fixed relation to each other. Thus in further operation of the indicating device, the minute and second hands will start from exactly the same point on the dial. Without a means of bringing the two hands mechanically and exactly in fixed relation to each other to start the timing, accuracy could not be maintained, for over a period of running the hands would get out of fixed relation to each other.

What I claim as new is:

1. A time indicating device comprising a casing; a motor driven speed-reduction transmission mechanism in said casing; a rotary shaft in said mechanism; a pinion fixedly mounted on one end of said rotary shaft; a rotatably supported axle; a disc-gear freely mounted on said axle and in mesh with said pinion; a clutch-disc fixedly mounted on said axle adjacent one side of said disc-gear; a reciprocally mounted clutch-disc carried on said axle in keyed relation thereto and on the opposite side of said disc-gear; a solenoid-operated lever for moving said last mentioned clutch-disc to frictionally engage said disc-gear between said clutch-discs; a bevel-pinion fixedly mounted on said axle; a vertical shaft; a bevel-gear fixedly carried on the lower end of said vertical shaft and in mesh with said bevel-pinion; a bevel-gear fixedly carried on the upper end of said vertical shaft; a cylindrical shaft mounted on said vertical shaft intermediate the bevel-gears on said vertical shaft; a jaw clutch member fixedly carried on said vertical shaft adjacent the lower end of said cylindrical shaft; a jaw clutch member reciprocally mounted on said cylindrical shaft in keyed relationship thereto; a solenoid operated lever for moving said last mentioned jaw clutch member into and out of engagement with said first mentioned jaw clutch member; a gear-wheel fixedly carried by said vertical shaft; a gear-wheel freely carried on said cylindrical shaft; speed-reduction gearing-mechanism between said first and last mentioned gear-wheels; a drum carried by said cylindrical shaft in keyed relationship thereto; a coil-spring frictionally engaging around said drum and connected at one end to said last mentioned gear-wheel; a bevel-gear fixedly carried on the upper end of said cylindrical shaft; bearings supported adjacent the upper ends of said vertical and cylindrical shafts; a cylindrical stub-shaft rotatably supported in each of said bearings; a bevel-pinion fixedly carried on the inner end of each of said cylindrical stub-shafts and in mesh with the bevel-gear carried on the upper end of said cylindrical shaft; a stub-shaft carried in each of said cylindrical stub-shafts; a bevel-pinion fixedly carried on the inner end of each of said stub-shafts and in mesh with the bevel-gear carried on the upper end of said vertical shaft; a dial carried on said casing relative to each of said stub-shafts respectively; a hollow spindle fixedly secured at one end to each of said cylindrical stub-shafts and extending through its respective dial; a spindle fixedly secured at one end to each of said stub-shafts and extending longitudinally through its respective hollow stub-shaft; a hand adjustably carried on the outer ends of each of said hollow spindles and a hand adjustably carried on the outer end of each of said spindles.

2. A time indicating device comprising a dial; a minute hand and a seconds hand rotatably mounted relative to said dial, said minute hand being carried by a hollow spindle and said seconds hand being carried by a spindle extending through said hollow spindle; a motor; transmission mechanism between said motor and said spindles to rotate said spindles at a predetermined speed ratio; means for adjusting said mechanism to cause said hands to rotate at the same speed by the motor and a solenoid for operating said means.

3. A time indicating device including a casing, a plurality of dials thereon, a primary and a secondary hand rotatively mounted relative to each of said dials, a motor, transmission mechanism connecting said motor and said hands, whereby to cause said hands to move relatively at a predetermined speed ratio, and electrically controlled means to govern said transmission mechanism to thereby cause said hands to move at the same speed.

4. A time indicating device including a casing, a plurality of dials thereon, a primary and a secondary hand mounted for movement relative to each of said dials, a motor, transmission mechanism connecting said motor and said hands for causing said hands to move at a predetermined speed ratio, and electrically controlled means for operating said transmission mechanism to cause said hands to move at the same speed on resetting.

5. A time indicating device including a casing, a plurality of dials thereon, a primary and a secondary hand mounted for movement relative to each dial, a motor, a transmission mechanism connecting said motor and said hands, said transmission mechanism including a rotary power shaft, electrically controlled means for connecting said power shaft and said motor, a plurality of drive shafts for said hands, and gearing between said drive shafts and said power shaft, said gearing operating said hands in predetermined relative speed ratio or operating said hands at the same speed in accordance with gearing selection.

6. A time indicating device including a casing, a plurality of dials thereon, hands cooperating with said dials, electrically-controlled means for operating the hands of the respective dials relatively at different speeds to indicate a predetermined time period, and means to return the hands at the same speed to non-time indicating positions following movement of said hands to indicate the predetermined time period.

7. A time indicating device including a casing, a plurality of dials thereon, a pair of hands for each dial, electrically-controlled transmission mechanism for moving said hands at a predetermined speed ratio, and electrically-controlled means whereby said transmission mechanism may be operated to compel movement of the minute hand at a speed equal with that of the second hand.

8. A time indicating device including a casing, a plurality of dials thereon, a pair of hands on and movable relative to each dial, electrically-controlled transmission mechanism for moving the hands of each dial, one hand at a speed of one revolution per minute and the other hand at a speed of one revolution per hour, and electrically-controlled means whereby said transmission mechanism may be operated to insure movement of the minute hands of all dials at a speed equal to the speed of the second hands of such dials.

9. A time indicating device including a casing, a plurality of dials thereon, a minute and a second hand on each dial, electrically-controlled transmission mechanism for simultaneously moving the hands of all dials at a predetermined speed ratio, and selectively operable electrically controlled means to insure movement of the hands of all dials at speeds equal to that of the second hands of such dials.

10. A time indicating device comprising a casing, a plurality of dials thereon, a primary hand for each dial, a secondary hand for each dial, electrically controlled transmission mechanism to rotate all primary hands at a predetermined speed, and means operated by said transmission mechanism for causing all secondary hands to rotate at the same speed, the speed of the secondary hands varying from the speed of the primary hands in predetermined ratio, and means for controlling the transmission to cause all hands to move at a speed equal to the speed of the secondary hands.

11. A time indicating device comprising a casing, a plurality of dials thereon, a primary and a secondary hand for each dial, electrically controlled transmission mechanism to rotate all primary hands at a predetermined speed, means operated by said transmission mechanism for causing all secondary hands to move normally at a predetermined speed increased relative to the speed of movement of the primary hands, and means for selectively controlling the transmission mechanism to cause all primary and secondary hands to move at the same speed at will.

12. A time indicating device including dials, two hands for each dial, means for moving the hands of each dial at relatively different speeds for indicating purposes, and means selectively operable at will to cause the slower of the two hands to move at the speed of the faster of such hands.

13. A time indicating device comprising a casing, a power means therein, concentric shafts, gearing operated by the power means for compelling rotation of said shafts at relatively different speeds, a normally inoperative clutch whereby the shafts may be interconnected for unitary movement at the same speed, a dial on the casing, a primary hand connected to one of said shafts and having indicating function on the dial, a secondary hand connected with the other of the shafts and having indicating function on the dial, and manually controlled means whereby the clutch may be rendered operative to cause the shafts and thereby the hands to move at the same speed.

14. A time indicating device including a casing, a dial thereon, a primary and a secondary hand cooperating with the dial, a power means, mechanism intermediate the power means and each hand to cause the respective hands to move at relatively different speeds, said mechanism including a normally inoperative clutch, manually operable means for rendering the clutch effective, and means whereby the clutch when rendered effective causes the primary and secondary hands to move at the same speed.

15. A time indicating device including a casing, a dial thereon, primary and secondary hands cooperating with the dial, concentric shafts connected respectively to the hands, a power means in the casing, gearing operated by the power means for actuating the shaft of the secondary hand at a predetermined speed, auxiliary gearing driven by the shaft of the secondary hand to drive the shaft of the primary hand at a relatively reduced speed, clutch elements connected respectively to both shafts, means for holding the clutch elements out of cooperation when the shafts are being driven at different speeds, and means to cause selective cooperation of the clutch elements to compel the shaft of the primary hand to be directly driven by and move at the same speed as the shaft of the secondary hand.

16. In combination, a time-instrument including seconds and minute time-indicating elements, gearing for normally inter-driving said elements, a motor for driving said seconds time-indicating element at proper time rate of speed, and means for causing said seconds time-indicating element to selectively drive said minute time indicating element at substantially the normal speed of said seconds time-indicating element for resetting the time-instrument.

FENTON ALEXANDER ROSS.